Patented Aug. 6, 1935

2,010,046

UNITED STATES PATENT OFFICE 2,010,046

PROCESS OF PRODUCING BARIUM NITRATE

Norman R. Wilson, Belleville, N. J., assignor to H. C. Bugbird Company, Inc., New York, N. Y., a corporation of New York No Drawing. Application December 11, 1931, Serial No. 580,485

3 Claims. (Cl. 23—102)

This invention relates to the manufacture of barium nitrate, and more particularly to an improved process for producing the same by the double decomposition of substances containing barium and the nitrate radicle. An object of the invention resides in the provision of such a process which is simple to carry out, makes possible the recovery of substantially all valuable substances with a minimum of operations, and results in a practically theoretical yield of the desired product without the need for complicated apparatus, excessive operations, or costly and time-consuming filtrations. Other objects and advantages will be in part apparent and in part pointed out in connection with the following detailed description of a preferred manner of practising the invention.

In order to produce barium nitrate in accordance with my invention, I may advantageously employ a commercially available material known as witherite, which contains large percentages of barium carbonate. However, any other material containing this ingredient may be used, provided that other substances contained in the material are not such as to interfere with the desired reaction. Barium carbonate of ordinary commercial purity may, of course, be used. To furnish the calcium for the reaction I prefer to employ a relatively soluble salt of calcium, for instance, calcium nitrate (air saltpeter). In carrying out my improved process I prefer to employ an amount of calcium nitrate which is in the neighborhood of three quarters of a molecular equivalent in excess of the theoretical equivalent for a given amount of barium carbonate, and to heat these substances in a quantity of water sufficient to dissolve all of the barium nitrate formed as well as all of the excess of the calcium nitrate at the temperature at which the reaction is concluded. Upon completion of the resulting reaction the solution may be separated from the precipitated calcium carbonate and allowed to cool sufficiently to permit the barium nitrate to crystallize. I have found that by proceeding in this manner and providing for the presence, at the termination of the reaction, of a quantity of water such that the large excess of calcium nitrate will not crystallize out, substantially all of this excess is available in the mother liquor for use in the next working of the process, while at the same time, the barium nitrate is fractionally crystallized out, as indicated above, so that it may be readily collected upon decanting of the mother liquor, and dried, if desired. This may be accomplished, for instance, by starting with sufficient water to allow for evaporation during the conduct of the reaction, without reducing the quantity of water below that desired at the end of the operation thus permitting the reaction to be carried out in an open vessel and avoiding the use of expensive autoclaves or the like.

I have found that in addition to the recovery in this manner of all of the excess of calcium nitrate, a substantially theoretical yield (based on the barium in the barium carbonate) of barium nitrate is obtained when an excess of about seventy-five percent or more of the molecular equivalent of calcium nitrate is employed. Furthermore, by following this process even the calcium carbonate may be recovered, though being of little value it may be discarded, if desired, without any really substantial loss.

By way of a specific example, the following details are given. 842 grams of barium carbonate, 94% pure, and 1456 grams of calcium nitrate, 79.5% pure may be added to 4800 grams of water in an open vessel and boiled for about two hours, at the end of which time the water will have been reduced to about 4000 grams by evaporation. The liquid may then be separated from the sludge containing the calcium carbonate, and allowed to cool, say to room temperature, whereupon barium nitrate crystallizes out. After separating the mother liquor from the crystals, as by decantation or a simple filtration, the mother liquor will be found to contain practically all the excess of calcium nitrate and will be available for use in the next batch, while a yield of barium nitrate of about 99% of the theoretical based upon the barium in the barium carbonate will have been obtained.

It will be understood that if the reaction is carried out in an autoclave the amount of water used may be reduced considerably, say to about 4000 grams, in the example given. Upon heating the materials in an autoclave pressure will, of course, be generated. However, this manner of conducting the reaction, besides involving the use of relatively expensive equipment, has not proved to yield as good results as when the ingredients are simply heated in an open vessel. It may also be noted that no catalyst or other foreign substance which might discolor the product is necessary to the working of the present process.

Although an excess of three quarters of a mol of calcium nitrate has been mentioned as preferred, this excess may be still further increased without adversely affecting the high yield of barium nitrate. For instance, two mols of calcium nitrate may be used for one of barium carbonate, provided sufficient water is used to insure keeping this excess in solution. On the other hand, the excess may be reduced to half a mol, or even somewhat less, with a loss of only about four percent of the theoretical yield based on barium. Even excesses of calcium nitrate of considerably less than half a mol, say in the neighborhood of one-third mol, result in good yields. However, in view of the substantially perfect yield afforded by the first-mentioned excess, its employment is highly advantageous, especially as it is substantially all recovered incident to the carrying out of the process and without the need for any additional steps.

While my invention has been described in great detail, the terms and expressions employed are used as terms of description and not of limitation, and there is no intention in the use of such terms of excluding any equivalents of the matter described, it being recognized that many modifications are possible within the scope of the invention.

I claim:

1. Process of producing barium nitrate, which comprises heating barium carbonate in the presence of water with an excess of about three quarters of a molecular equivalent of calcium nitrate until more than 95% of the barium carbonate has reacted to yield barium nitrate, separating the resulting solution from precipitated calcium carbonate, and then cooling the solution to the point at which substantially all of the barium nitrate is crystallized out, said water being present in such amount that substantially all of said excess of calcium nitrate remains in the cooled solution.

2. Process of producing barium nitrate, which comprises heating barium carbonate in the presence of water with an excess of over one half of a molecular equivalent of calcium nitrate until substantially 95% or more of the barium carbonate has reacted to yield barium nitrate, separating the resulting solution from precipitated calcium carbonate, and then cooling the solution to the point at which substantially all of the barium nitrate is crystallized out, said water being present in such amount that substantially all of said excess of calcium nitrate remains in the cooled solution.

3. Process of producing barium nitrate, which comprises heating barium carbonate and calcium nitrate, the calcium nitrate being present in excess of the theoretical molecular equivalent to the extent of substantially 50% or more so as to be sufficient to effect substantially 95% or more complete decomposition of the barium carbonate during the single heating treatment, the heating of the materials being carried out in the presence of an amount of water substantially double the weight of the materials and being carried to a point where the reaction is substantially completed, and the evaporation of the water is insufficient to cause crystallization of barium nitrate or calcium nitrate in hot solution, separating the resulting solution from precipitated calcium carbonate, and then cooling the solution to a point sufficient to effect substantially complete separation of crystals of barium nitrate.

NORMAN R. WILSON.